INVENTORS.
GEORGE J. TOPOL,
LESLIE B. BARANOWSKI, &
IVAN BARTIK
BY
Albert L. Jeffers
ATTORNEY Jan. 27, 1959  G. J. TOPOL ET AL  2,870,859
PROCESS AND APPARATUS FOR DE-AERATING
OLEAGINOUS MATERIALS
Filed June 19, 1957  2 Sheets-Sheet 2

INVENTORS.
GEORGE J. TOPOL,
LESLIE B. BARANOWSKI, &
IVAN BARTIK
BY
Albert L. Jeffers
ATTORNEY

United States Patent Office 2,870,859
Patented Jan. 27, 1959

2,870,859

PROCESS AND APPARATUS FOR DE-AERATING OLEAGINOUS MATERIALS

George J. Topol, Hamilton, Ontario, and Leslie B. Baranowski and Ivan Bartik, Burlington, Ontario, Canada, assignors to Bowser, Inc., Fort Wayne, Ind., a corporation of Indiana Application June 19, 1957, Serial No. 666,518

14 Claims. (Cl. 183—2.5)

This invention concerns both the process and apparatus for removing dissolved gaseous fractions from oils and the like.

The presence of dissolved gases in insulating oils such as those commonly used in transformers can become objectionable because gas bubbles form under changing conditions of pressure and temperature which detract from the insulating function of the transformer oil. The dissolved gases are also objectionable since they lead to formation of undesired compounds which adulterate the oil. For these reasons the dissolved air and/or other gases are considered to be contaminates and their removal provides an improved oil which prolongs and improves the transformer operation.

The invention is not, of course, limited to the processing of any specific oil or for that matter any specific liquid. The invention comprehends broadly the removal of both moisture and dissolved gases from any selected nonvolatile liquid.

The absorption capacity of liquids for gases is influenced both by pressure and temperature. Increased temperatures and reduced pressures generally lower the absorptive capacity and conversely reduced temperatures and increased pressures increase the absorptive capacity of liquids for gases.

The present invention achieves separation (removal) of the absorbed gases, principally, by subjecting the oil to subatmospheric pressures thus lowering the absorption capacity of the oil and thereby releasing the dissolved gas.

One of the main problems which needed to be surmounted in making feasible such a "pressure-reduction" technique was control of the foam or spume which normally develops incidentally to the liberation of dissolved gas at the oil surface. This occurrence of foam greatly restricted operation of the de-aerating apparatus, limited the rate of degasification of the oil, and converted the oil to an unusuable frothed condition.

It is one of the objects of the invention to overcome the complication of frothing or foaming of the oil during degasification thereof and to accomplish this in part by means of the discovery that a fibrous or reticulated element such as fiberglass will, if exposed at the oil surface, assist in liberation of the dissolved gas and will suppress the formation of oil foam or spume normally incident to the removal of dissolved gases under reduced pressure.

Another feature of the invention lies in the disintegration of that foam which does occur by means of passing the oil successively through two or more progressively reduced atmospheric chambers, it having been discovered that the objectionable foam is destroyed by subjecting it to sudden expansion by abrupt reduction of pressures.

A further feature of the invention relating to foam control is the usage of a foraminous medium such as screen or the like. In destroying the foam the present invention proposes to collect and push the foam through such a foraminous medium to thereby obtain its efficient and rapid disintegration.

An overall object of the invention is to provide a continuous and completely automatic process for degasifying oils, this process being characterized by the speed with which the dissolved gas can be efficiently removed.

An additional feature in the degasification treatment of the oil is that the processing rate can be made responsive to the temperature of the oil so that at lower temperatures a part of the oil can be recycled thus obtaining a temperature-compensating factor.

Though the degasification is achieved principally by the pressure reduction method, this can be supplemented by heating the oil to assist in release of any dissolved gas. As will become evident from the description, foam control may also be improved by applying heat which promotes the rate of disintegration of the foam or spume.

Other objects and features of the invention will become apparent from a consideration of the following description which proceeds with reference to the accompanying drawings, wherein.

Figure 1:
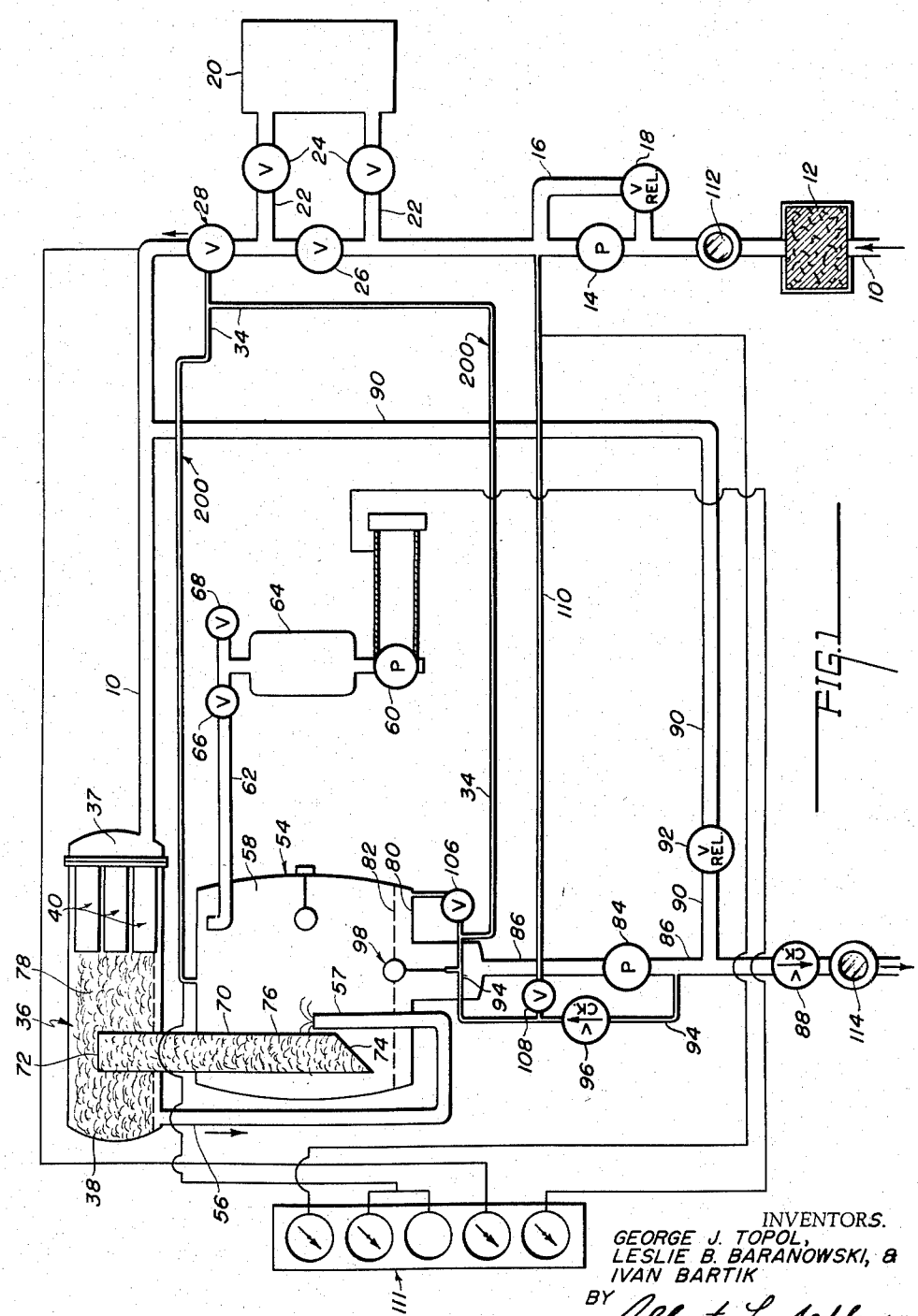
Figure 1 is a schematic view of the de-aerating apparatus having indicated thereon the passage of oil therethrough.

Referring now to Figure 1, an inlet line 10 transmits the incoming oil first through a filter 12 which removes solid contaminants.

A supply pump 14 is provided to force feed the oil through the inlet or supply line 10. A bypass line 16 with relief valve 18 is built around the supply pump 14 to shunt the oil in case there is clogging downstream of the pump 14.

A heating unit 20 with tap lines 22 is interconnected with supply line 10 to preheat all or any desired fraction of the incoming oil and valves 24 and 26 are provided to determine the desired fraction of incoming oil which is heated preparative to separation of the dissolved gas by means of reduced pressure.

Figure 4:
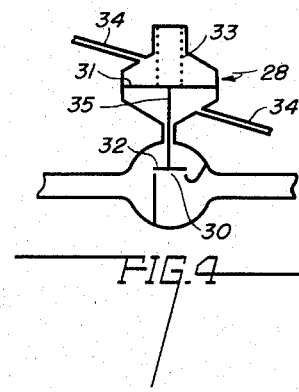
Figure 4 is an enlarged detail view of the regulating valve used in controlling the rate of inlet for the oil into the apparatus; and, Figure 5 is a detail view of the float valve located in one of the chambers and used for governing the inflow of oil to the apparatus in accordance with the capacity of the apparatus.

A regulating valve 28 (Figure 4) is used to control the rate of oil flow through the supply line 10. The regulating valve consists of an orifice 30, a valve 32 controlling the effective size of the orifice 30, and a spring loaded diaphragm 31 which controls the position of the valve 32 through a valve stem 35. On either side of the diaphragm are pilot lines 34 responsive to pressure in other parts of the system as will be explained later.

Figure 2:
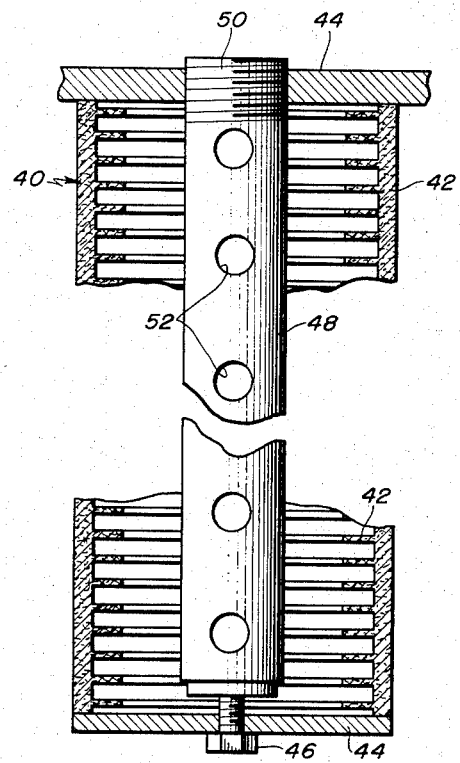
Figure 2 is an enlarged sectional detail view of the fiberglass element used in suppressing foam in one of the chambers.

The supply line 10 terminates in tank 36 which forms a first reduced pressure chamber 38. The incoming oil flows into a chamber 37 and then passes through one of a plurality of fiberglass elements (Figure 2) which are generally indicated by reference numeral 40. Since all the fiberglass elements are constructed alike, only one will be described in detail.

Each fiberglass element is made up of alternating fiberglass disks 42 composed of resin bonded fiberglass. The disks are clamped between end plates 44 by means of a bolt 46 which is threadedly received in tubular member 48. The tubular member is threaded at end 50 for mounting the element in tank 36. The interior of the tubular member has a number of openings 52 which permit the incoming oil to flow over the inner surface of the fiberglass disks. The fiberglass disks 42 distribute the oil over a large area and then expose the oil as it emerges on the outer peripheral surface of the disks to prevailing subatmospheric conditions within chamber 38. This distribution of oil over a wide surface so that the oil is exposed as a thin film, facilitates the release of solubilized gases, possibly by reducing the length through which the bubbles of air must migrate in order to reach the oil surface and thereby escape.

The formation of a film of oil is believed to embody two significant factors:

(1) There is less foaming, frothing or spuming at the surface of the oil which is usually incident to gas liberation, and, (2) There is less time required to achieve degasification. This means gas bubble formation and expulsion at the oil surface will proceed rapidly and the efficiency thereof permits oil to flow across the filter element at a steady, fast rate. For example, with a fiberglass unit 16" long, and 3½" in diameter, I have experienced satisfactory degasification of oil running through the fiberglass element at 150 G. P. H. (gallons per hour).

It is not essential to the invention that the fiberglass elements 40 to be projected inwardly within the tank 36 as shown. It has been found that a quantity of fiberglass or similar material floating at the surface of the oil greatly assists in liberation of the gas and suppresses the formation of foam to a remarkable degree. The invention would include therefore as an equivalent arrangement, the provision of fiberglass elements floatable on the surface of the oil contained in tank 36.

A second tank 54 is connected in series with said first tank 36 by means of a syphon line 56 which projects upwardly within tank 54 to provide a stand pipe 57.

The interior of tank 54 forms a second vacuum chamber 58 which is maintained at a pressure lower than chamber 38. The pressure differential in the two chambers 38 and 58 is in the order of about 5 mm. of mercury.

The chamber 58 is exhausted by means of a vacuum pump 60 and vacuum line 62. An oil separator 64 is included to extract any oil which is entrained with the gases to be removed from chamber 58. Valves 66 and 68 are provided so that line 62 can be shut off and the vacuum pump used independently of chamber 58.

Figure 3:
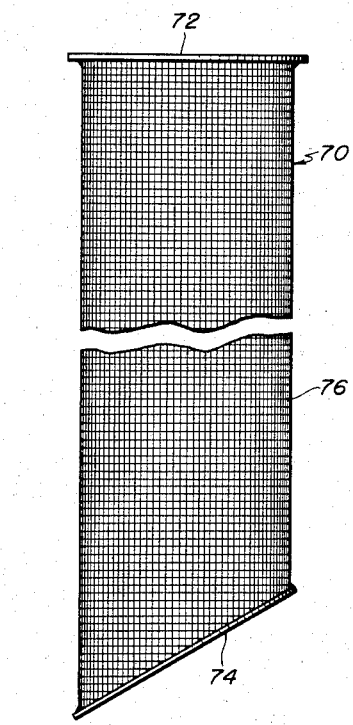
Figure 3 shows an enlarged detail view of the foraminous element used in breaking up the foam as it is conducted between successive chambers of progressively reduced pressure.

Also interconnecting chambers 38 and 58 is a duct 70 which is open at end 72 and closed at end 74. The wall portion 76 of the duct which extends within the chamber 58 is a foraminous screen construction (Figure 3) which has been discovered to have a disintegrating effect on any foam which is pushed therethrough.

The pressure differential between chambers 38 and 58 pushes the foam (indicated by reference numeral 78) from chamber 38 into chamber 58 through the duct 70. The foraminated construction of the screen causes the foam to burst as it impinges the foraminated wall 76 and is forced through the openings of the screen and into chamber 58.

At the bottom 80 of tank 54 there is collected the degasified liquid oil 82 which is withdrawn from the tank 54 by a discharge pump 84 through an outlet line 86 containing a check valve 88. The check valve 88 may be thermostatically controlled in any desired manner, such as the way shown in my copending application Ser. No. 607,901, filed September 4, 1956.

The purpose of this thermostatic control in the outlet line 86 is to re-cycle all or any portion of the processed oil when the temperature of the oil makes gas removal more difficult. This re-circulation of oil takes place through a return line 90 having a relief valve 92. The relief valve is also a safety measure in that oil is automatically re-cycled through the apparatus if there should be any clogging in discharge line 86 downstream of the outlet pump 84.

A pilot line 94 leads from the discharge line 86 through a one-way check valve 96 and float valve 98 in tank 54 to connect with pilot line 34 leading to regulating valve 28.

The arrangement of pilot line 34 and float valve 98 in conjunction with the outlet pump 84 is to inter-relate the incoming and outgoing flow of oil so that the process of de-aeration is continuous and substantially automatic.

Figure 5:
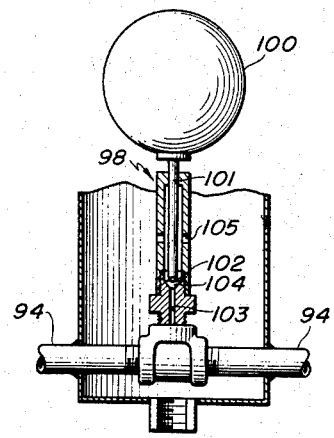

The float valve 98 (Figure 5) is essentially the same in construction and operation as that shown in my copending application Ser. No. 607,901, cited previously. The float valve 98 comprises a float 100 which, acting through a valve stem 101, is designed to lower or raise a valve 102 relatively to the valve seat 104 to affect the pressure in pilot line 94. Thus, when the level of oil in chamber 58 is high, the float 100 is lifted, unseating valve 102 and reducing the pressure in pilot line 94 through passage 103 and ports 105, which has the effect of throttling fluid flow by regulating valve 28. Conversely, when the liquid level in tank 54 is low, the valve 102 is seated and the entire pressure developed by discharge pump 84 acting through pilot line 94 is available for transmittance to the regulating valve 28 to cause the regulating valve to open against the resistance of spring 33 and permit passage of oil unobstructedly therethrough. Thus, the rate of inflow of oil through line 10 is regulated by valve 28 which is operated responsively to both the discharge pressure in line 86 and the level of fluid in tank 54.

The two valves 106 and 108 are used for emptying the tanks 36 and 54 and re-starting the de-aerating operation.

For example, to empty the tanks 36 and 54 and terminate the de-aerating process, the valve 106 is opened and this causes an immediate pressure drop in line 34 which shuts off regulating valve 28 against any further inflow of oil. The oil in tanks 36 and 54 is then removed by the discharge pump 84.

To re-start the de-aerating process, the valve 108 is opened and the valve 106 and float valve 98 are closed. The pilot system 200 is supplied with oil from the supply pump 14 through lines 10 and 110. The one-way check valve 96 prevents the flow of oil from escaping into the discharge line 86. The pressure in the pilot system permits the valve 28 to open to allow the oil to flow into chamber 36 through line 10. When sufficient quantity of oil is collected in the chamber 54, the valve 108 is closed and the discharge pump 84 is started. The apparatus is thus returned to working condition.

The apparatus is subject to inspection of operating conditions by means of a display panel 111 which registers such operating parameters as supply pressure, operating vacuum, oil temperature, water temperature, etc. The gauges and sensing lines are believed self-explanatory from Figure 1. The oil is visually inspective at the inlet line 10 and outlet line 86 by means of flow sights 112 and 114.

The de-aerating apparatus will next be described in terms of its operation:

The inlet pump 14 forces the incoming oil through the filter 12 and through the inlet line 10 which first conducts the oil through a heat exchanger 20 which heats the oil a predetermined amount.

The oil is then ejected into the chamber 38 of tank 36 via the chamber 37 and fiberglass elements 40. As the oil passes through the fiberglass elements 40 the elements are suffused with the oil which is thereby formed in a thin layer over the outer periphery of the fiberglass elements. This thin spreading of the oil facilitates removal of absorbed gas which is released under the subatmospheric conditions of chamber 38.

Even though the fiberglass elements 40 suppress the formation of foam 78 there is some foaming which occurs because of the fast rate of introduction of the oil into chamber 38. The bulk of the oil collects at the bottom of tank 36 and is thereafter conducted to tank 54 via syphon 56. The pressure differential between chambers 38 and 58 forces the layer of liquid oil in chamber 38 into chamber 58. As the oil flows out the exit port of standpipe 57 it is exposed to the lower pressure in chamber 58 thus further removing any dissolved gas in the oil which emerges from the standpipe 57 in a thinly spread stream.

The foam 78 in chamber 38 is swept into the duct 70 by the pressure differential in chambers 38 and 58 and is conveyed into the chamber 58. When the foam reaches chamber 58 it is ejected through the foraminous screen portion 76 and in doing so the forcible impingement of the foam as it passes through the screen causes a disintegration thereof. A further factor in destroying the foam is the abrupt exposure of the foam to lower pressure conditions. Under these conditions the foam is effectively dissipated. The gaseous component of the foam is exhausted through vacuum line 62 and the liquid component of the foam collects at the bottom 80 of the tank 54 in a degasified oil layer 82 which is withdrawn by pump 84 through discharge line 86.

The inflow of oil into chamber 54 is regulated by the level of the oil in the tank which actuates the float valve 98 to keep a sufficient amount of oil entering the chamber in balance with the amount of oil being withdrawn. The pressure in the line 86 downstream of the pump 84 varies with the rate of discharge and with the length of the hose and the type of equipment attached to the discharge of the de-aerator.

The regulating valve 28 is opened by degrees according to pressure developed in pilot line 34; this pressure is reducible by operation of float valve 98 to thereby throttle or discontinue flow through valve 28. As the level of oil in chamber 54 rises, the float 100 is lifted thus relieving pressure in pilot line 94, the reduced pressure is communicated via pilot line 34 to the regulating valve 28, thereby throttling or shutting off inflow of oil to chamber 38 through the inlet line 10.

The operation of de-aeration is continuous and automatic, and the removal of air from the oil is substantially complete and proceeds rapidly. Above all, the complication of foaming is substantially overcome by the process described.

In brief review, several principles are utilized in accomplishing the removal of air: first the air is caused to precipitate by means of pressure reduction, agitation of the oil is used to promote air precipitation by means of spilling oil in one phase of the invention, namely through standpipe 57, a fiberglass unit is used to spread the oil over a large surface area/volume ratio to facilitate air removal, the fiberglass is used to suppress foam formation, such foam which does occur is disintegrated by subjecting the foam to sudden reduced pressure conditions, and the foam is also fractured by means of passing it through a foraminated medium. The last mentioned feature involves a "two stage" reduction of pressure.

The process may be supplemented by heating the foraminated member which conducts the foam between the two stage pressure reduction chambers.

As a result of these principles there is obtained a number of advantages which include (1) high capacity of processing oil; (2) lower temperatures are usable with the oil to be processed; (3) the formation of foam is obviated as a processing complication; (4) both solid and moisture contaminations are separated from the oil; and (5) the correct balance of incoming and outgoing fluid can be established and maintained.

The inlet pump 14 can be eliminated, if desired; the outlet pump 84 is sufficient in many cases.

It will be understood that the described apparatus and process are only illustrative of the invention and not to be interpreted as restrictive thereof. Numerous modifications and revisions of the invention are to be reasonably expected on the part of those skilled in the art, it is intended that such variations and revisions of the invention as incorporate the herein disclosed principles will be included within the scope of the following claims.

We claim:

1. A de-aerating apparatus for removing dissolved gases from oils and the like, including a first chamber maintained at subatmospheric pressure, a plurality of fibrous elements combined with said first chamber and through which incoming oil is forcibly ejected, a second chamber maintained at a subatmospheric pressure less than said first chamber to provide thereby a pressure differential, means for conducting the degasified liquid layer of oil or the like from said first chamber to said second chamber, means for collecting and conveying the spume fraction of the processed oil from said first chamber to said second chamber, and foraminated means combined with said conveying means and through which the spume is forcibly ejected into said second chamber to be thereby fractured into its constituent gaseous and liquid components.

2. The apparatus of claim 1 including means associated with said second chamber for exhausting the liberated gaseous phase to maintain subatmospheric pressure therein, and means cooperative with said second chamber for withdrawing the degasified liquid phase.

3. The apparatus of claim 1 in which the pressure differential between said first and second chambers is utilized for expelling the liquid phase and spume from said first chamber to said second chamber for further resolution into their respective gaseous and liquid constituents.

4. An apparatus for continuous degasification of oleaginous materials in which the gasified material is periodically or continuously introduced to the apparatus and degasified liquid is withdrawn periodically or continuously in accordance with the input of material, said apparatus comprising at least two separated subatmospheric chambers having a pressure differential thereacross, reticulated means in combination with the one chamber having a higher pressure therein and through which gasified liquid is movable to be exposed on the surface of the reticulated means to the subatmospheric pressure prevailing in said one chamber, means interconnecting said first and second chamber for conducting the degasified liquid phase from said one chamber to the other chamber, additional interconnecting means between said chambers for conveying the frothed portion from said one chamber to the other chamber, reticulated means through which the froth is ejected in its passage into said second chamber to facilitate disintegration thereof into the component gaseous and liquid constituents, means operatively associated with said second chamber to control the rate of liquid ingress to the system responsive to the withdrawal of degasified liquid from the second chamber, and means for forcibly feeding gasified liquid to the apparatus for degasification.

5. A de-aerating apparatus according to claim 4 in which there is included temperature-responsive control means in conjunction with the discharge of said second chamber for recycling fluid from said second chamber through the apparatus for re-processing.

6. A de-aerating apparatus for gasified materials comprising at least two separated chambers through which the gasified material is successively passed, said first chamber including a fibrous element through which the incoming material is ejected to expose the incoming material to subatmospheric pressure in said first chamber where it is thereby separated into a partially degasified liquid component and a spume or foam content, means for conducting the spume and partially degasified liquid to said second chamber wherein subatmospheric pressure is maintained at a lower level than said first chamber to provide a pressure differential between said chamber which conveys the liquid and spume from the first chamber to the second chamber, and foraminous means through which the spume is forced in passing from said first chamber into said second chamber whereby the spume is broken up to release the gaseous fraction thereof.

7. The de-aerating apparatus of claim 6 in which there is included a discharge pump for withdrawing degasified material from said second chamber.

8. The apparatus of claim 7 in which pressure responsive means is provided in combination with said first chamber to regulate the incoming rate of material flow into said first chamber.

9. In the apparatus of claim 8, a discharge pump is cooperatively associated with said second chamber to withdraw degasified material therefrom, and means for combining said discharge pump and pressure-responsive regulating means whereby the rate of material inlet to the apparatus and exit therefrom are suitably apportioned.

10. In the apparatus of claim 9 governing means in conjunction with said second chamber and operable according to the amount of material therein, said governing means being associated with said discharge pump and said material inflow regulating means to limit the quantity of incoming material according to the capacity of said second chamber whereby gasified material may be continuously fed to the apparatus and degasified material continuously withdrawn.

11. A process for removing dissolved gas from oils and the like comprising the steps of: introducing through a fibrous medium a quantity of gasified oil into a subatmospheric first chamber to cause release of dissolved gas, passing the liquid fraction of oil from said first chamber to a second chamber of lower pressure, collecting and conveying to said second chamber any oil foam which develops in said first chamber incidental to gas release, forcibly ejecting said foam through a foraminous medium as it passes into said second chamber where the expansion and forcible impingement of the foam disintegrates the foam and resolves it into a degasified liquid fraction.

12. The process of claim 11 including the steps of controllably withdrawing the degasified oil from said second chamber, and feeding continuously a quantity of gasified oil to said first chamber in accordance with the rate of withdrawal from said second chamber whereby the degasification process is both continuous and automatic.

13. The process of claim 12 including the step of measuring the quantity of oil in said second chamber and regulating the inflow of gasified oil to said first chamber according to the quantity of oil in said second chamber.

14. The process of claim 13 including the steps of regulating the outflow of oil from said second chamber responsively to the temperature thereof, and recycling a portion of the outflow according to the temperature thereof.

References Cited in the file of this patent
UNITED STATES PATENTS

| | | |
|---|---|---|
| 1,569,105 | West | Jan. 12, 1926 |
| 1,710,474 | Dodd | Apr. 23, 1929 |
| 2,160,028 | Moore | May 30, 1939 |
| 2,751,031 | Smith et al. | June 19, 1956 |